May 17, 1955 E. G. VON GUNTEN 2,708,270
EYE SHADE

Filed Oct. 16, 1951 2 Sheets-Sheet 1

INVENTOR.
EDWARD G. VON GUNTEN
BY
ATTORNEY

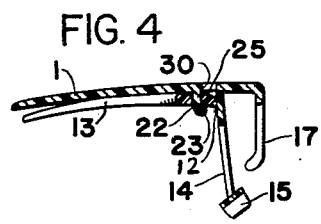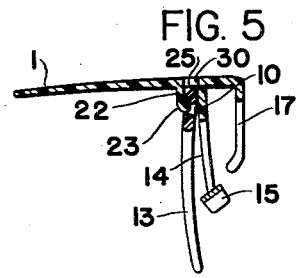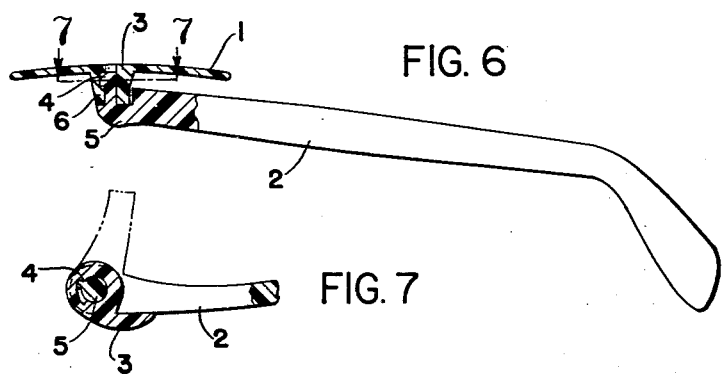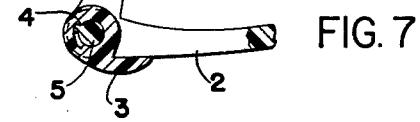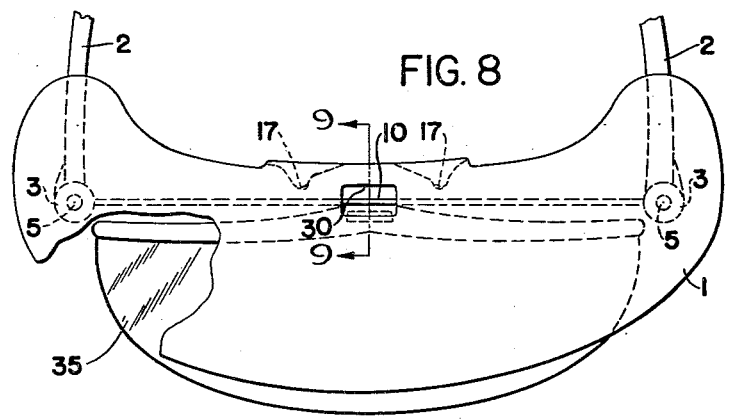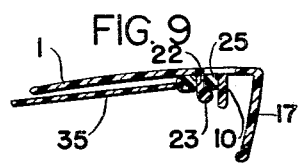
INVENTOR.
EDWARD G. VON GUNTEN
ATTORNEY 500 # United States Patent Office 2,708,270
Patented May 17, 1955

2,708,270

EYE SHADE

Edward G. Von Gunten, Akron, Ohio, assignor, by decree of distribution, to Maggie B. Von Gunten Application October 16, 1951, Serial No. 251,490

12 Claims. (Cl. 2—13)

This invention relates to an improved eye shade. Eyeglasses or the like are pivotally attached to the underside of the eye shade. These can be lowered in front of the eyes of the wearer when the wearer desires to look through them, and held against the underside of the visor when they are not in use; and means is provided for holding them in each position.

The eyeglasses may be ground to complement spectacles or the like worn by the wearer of the eye shade. Thus, the spectacles worn by the wearer may be designed for close or far vision, and the eyeglasses attached to the underside of the visor may correct these for far or close vision. Thus, if a draftsman is wearing spectacles for close vision, the eyeglasses may correct these for far vision and the draftsman can merely snap them down in front of his regular glasses whenever he looks up from his drawing board, and snap them back when he returns to his work. Conversely, a golfer who is wearing distance glasses, can snap the eyeglasses in position for use when he marks the score, and snap them back again against the visor of the eye shade when this is done.

The eyeglasses need not be corrective, they may be merely colored glasses such as sunglasses.

The term "eyeglasses" as used herein is used in the broad sense and includes a sheet of colored plastic, such as cellulose acetate, etc. which may be pivotally fastened to the underside of the visor and used as sunglasses.

The eyeglasses are advantageously removably attached to the underside of the visor so that they may be replaced by other eyeglasses as needed. An opening is provided at the center of the eyeglasses near the top. This opening may be the opening under the bridge of the eyeglasses, or it may be an opening through the frame. This opening accommodates a finger which projects down from the visor and cooperates with another finger or flange which projects downwardly from the visor to hold the eyeglasses between them. The arrangement includes cam means which holds the glasses either turned up against the underside of the visor or extending downwardly in front of the eyes of the wearer.

The invention will be further described in connection with the accompanying drawings, in which—

Fig. 4 is a section on the line 4—4 of Fig. 3;

Figure 1:
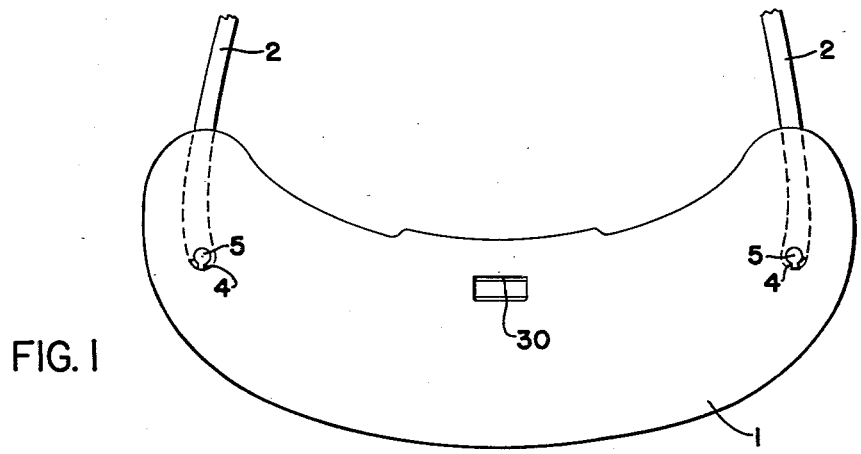
Fig. 1 is a plan view of the top of the eye shade.
Figure 2:
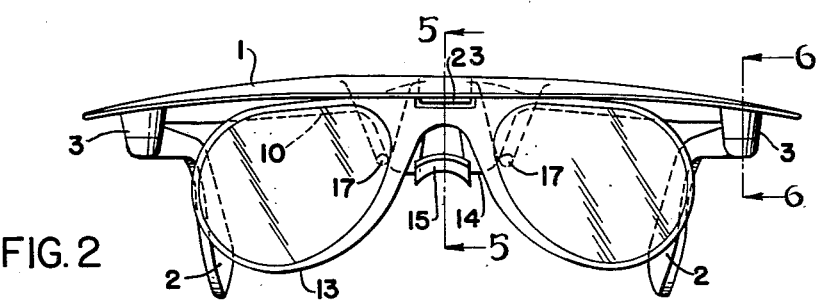
Fig. 2 is a front view of the eye shade with the eyeglasses turned down.
Figure 3:
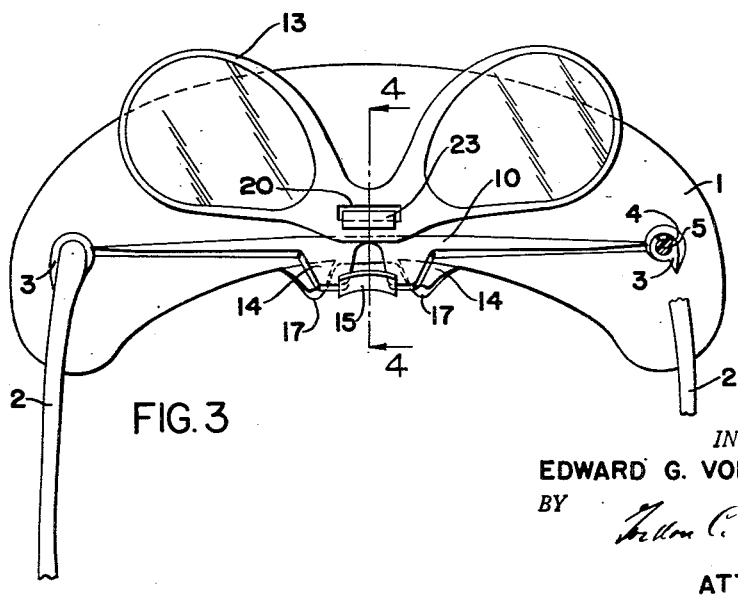
Fig. 3 is a view of the underside of the eye shade with the glasses turned up.

Figs. 5 and 6 are sections on the lines 5—5 and 6—6 of Fig. 2, respectively;

Fig. 7 is a section on the line 7—7 of Fig. 6 illustrating the movement of one temple of the eye shade, showing one position of the temple in phantom lines;

Fig. 8 is a plan view of the top of an eye shade of alternative construction; and Fig. 9 is a section on the line 9—9 of Fig. 8.

The visor 1 of the eye shade is provided with temples 2 which are pivotally and detachably engaged in bosses 3 on the underside of the eye shade. An enlargement 4 (Fig. 6) on the pivot 5 of the temple which extends into the boss 3, fits into the boss when the temple is positioned across the eye shade and engages with the enlargement 6 and holds the temple in the boss when the temple is extended backwardly in the position in which it rests over the ear of the wearer. Although the drawings illustrate the temples as being thus removable, they may be permanently attached to the visor.

A fin 10 extends from one boss 3 to the other. Its ends are fastened to the visor, but its middle portion is free to move back and forth and serve as a spring which cooperates with the movement of the cam 12 on the eyeglasses 13, as will be explained. This fin projects downwardly at the center to form bridge 14 to which the nose rest 15 is attached. In back of the fin are fingers 17 which likewise project downwardly. If the wearer of the eye shade is wearing spectacles or the like, the fin 10 will press against their front side and the fingers against their rear side so that the eye shade will be held accurately positioned with respect to them.

At the bridge of the eyeglasses 13 is an opening 20. The short finger or hook 22 projects downwardly from the center line of the eye shade and enters this opening. The end of the finger 23 extends rearwardly and holds the eyeglasses.

The cam 12 which is the top of the bridge is beveled at 25 (Fig. 5). In assembling the eyeglasses with the eye shade, the eyeglasses are held vertically and slipped between the finger 22 and the fin 10. The fin serves as a spring so that the space between it and the finger may be widened. The beveled surface 25 guides the bridge of the glasses against the end 23 of the finger, and the fin 10 gives sufficiently to permit the bridge to pass the finger. The pressure of the finger on the front of the assembled eyeglasses, and the pressure of the fin 10 on the rear of them, holds the eyeglasses vertically in front of the eyes of the wearer. When they are not wanted they are merely turned up, flat against the visor. This moves the fin backwardly sufficiently to put it under tension. The inner surface of the fin slants slightly backwardly, and as a consequence of this and the fact that the surface 25 is beveled, the fin must be moved further backward in order to be returned to a vertical position. The tension of the fin thus holds the eyeglasses against the underside of the visor. Thus the eyeglasses can be snapped into either the one position or the other, and they can't be moved from either position without being moved against the spring pressure of the fin.

The visor is preferably molded of plastic, and the opening 30 is formed by a projection of the mold which forms the top surface of the projection 23 on the finger 22. The eyeglasses 13 may have a plastic frame or the frame may be made of any suitable material.

In the alternative construction shown in Figs. 8 and 9 the eyeglasses are formed of a single piece of plastic 35, instead of a separate glass for each eye.

If the wearer is wearing nose glasses, the bridge 10 and fingers 17 will fit on opposite sides of these. The temples will be used to steady the visor and nose glasses. If the wearer is wearing spectacles, the temples may advantageously be removed. If the wearer is wearing neither spectacles nor nose glasses, the nose rest 15 will support the eye shade. Thus the eye shade is designed for universal use.

What I claim is:

1. An eye shade which includes a visor, means on the underside of the visor for attachment to spectacles and the like, and relatively rigid plastic sunglasses pivotally attached to the underside of the visor, and a cam on the sunglasses cooperating with the substantially vertical surface of a member depending from the underside of the eye shade to maintain the sunglasses substantially flat against the underside of the visor when placed in that position.

2. The eye shade of claim 1 in which there is a nose piece on the under side of the visor and temples extending backwardly from the respective outer edges thereof.

3. The eye shade of claim 1 in which the sunglasses are hooked at the bridge on a hook projecting down from the visor.

4. The eye shade of claim 1 in which the bridge of the sunglasses is held between the underside of the visor and a hooked finger which extends down from the visor on which the bridge of the sunglasses is hooked.

5. The eye shade of claim 1 in which the bridge of the sunglasses is held between the underside of the visor and a hooked finger which extends down from the visor on which the bridge of the sunglasses is hooked, the cam being located on top of the bridge of the sunglasses.

6. In combination, an eye shade having means thereon for clamping the same in relatively fixed position to spectacles and the like, plastic relatively rigid sunglasses, and supporting means on the eye shade in front of said clamping means on which the sunglasses are removably supported.

7. In combination, an eye shade having means thereon for clamping the same in relatively fixed position to spectacles and the like, plastic relatively rigid sunglasses, and supporting means on the eye shade in front of said clamping means on which the sunglasses are movably supported with means for holding the sunglasses so supported in the line of vision of the wearer and also for holding the sunglasses so supported with the front thereof raised so that the sunglasses are out of the line of vision of the wearer.

8. An eye shade which includes a visor, means on the underside of the visor for clamping the same in relatively fixed position to spectacles and the like, and extending downwardly from the visor in front of said clamping means a hook which is adapted for the support of plastic relatively rigid sunglasses thereon.

9. In combination, an eye shade having means on the underside thereof for clamping the same in relatively fixed position to spectacles and the like, plastic relatively rigid sunglasses with an opening therein, and a hook extending downwardly from the eye shade in front of said clamping means, the sunglasses being removably supported on the hook by passage of the hook therethrough.

10. An eye shade which includes a visor, a hook extending downwardly from the eye shade whcih hook faces to the back of the eye shade and is adapted for the support of eyeglasses thereon, and means which extends downwardly from the visor behind the hook which means is adapted for frictional contact with the top of eyeglasses supported on the hook when the eyeglasses are in a substantially horizontal plane, said hook and the means behind it being elastically yieldable with respect to one another, whereby the space between them may be widened by pressing them apart.

11. In combination, an eye shade having means on the underside thereof for attachment to spectacles and the like, and means for assembling eyeglasses therewith which includes both a hook in front of said attachment means and means near the point of the hook but spaced a short distance therefrom, with the hook and said latter means elastically yieldable with respect to one another, whereby they are spread apart when eyeglasses with an opening therein are forced between them but return when the opening is over the point of the hook.

12. In combination, an eye shade having means on the underside thereof for attachment to spectacles and the like, and a hook extending down from the underside of the eye shade in front of said means, eyeglasses removably supported on the hook by means of an opening in the eyeglasses, and means near the point of the hook but spaced a short distance therefrom with the hook and said means elastically yieldable with respect to one another, whereby unintentional removal of the eyeglasses from the hook is prevented and the space between the hook and said means near its point may be widened for placement of the eyeglasses on the hook and removal therefrom.

References Cited in the file of this patent

UNITED STATES PATENTS

| | | |
|---|---|---|
| 886,209 | Henry | Apr. 28, 1908 |
| 1,709,765 | Auel | Apr. 16, 1929 |
| 1,890,865 | Scherz | Dec. 13, 1932 |
| 2,388,626 | Wilson | Nov. 6, 1945 |
| 2,544,221 | Creighton | Mar. 6, 1951 |